(12) United States Patent  
Berland

(10) Patent No.: US 8,537,636 B2
(45) Date of Patent: Sep. 17, 2013

(54) PROTECTIVE SOCKET FOR A SENSOR NODE

(75) Inventor: Norvald Berland, Fyllingsdalen (NO)

(73) Assignee: Siemens Aktiengesellschaft, Munich (DE)

( * ) Notice: Subject to any disclaimer, the term of this patent is extended or adjusted under 35 U.S.C. 154(b) by 699 days.

(21) Appl. No.: 12/669,567

(22) PCT Filed: Jul. 11, 2008

(86) PCT No.: PCT/NO2008/000264
§ 371 (c)(1),
(2), (4) Date: Feb. 11, 2010

(87) PCT Pub. No.: WO2009/014451
PCT Pub. Date: Jan. 29, 2009

(65) Prior Publication Data
US 2010/0195435 A1    Aug. 5, 2010

(30) Foreign Application Priority Data
Jul. 23, 2007  (NO) .................................. 20073863

(51) Int. Cl.
*G01V 1/38* (2006.01)
(52) U.S. Cl.
USPC ............................. 367/20; 367/154; 367/188

(58) Field of Classification Search
USPC ................... 174/77 R, 101.5; 367/154, 159, 367/172
See application file for complete search history.

(56) References Cited

U.S. PATENT DOCUMENTS

| 2,708,742 | A | * | 5/1955 | Harris | 367/154 |
| 2,762,032 | A | * | 9/1956 | Vogel | 367/154 |
| 6,385,132 | B1 | | 5/2002 | Sackett | |
| 6,775,203 | B2 | | 8/2004 | Fagerås et al. | |

FOREIGN PATENT DOCUMENTS

| EP | 1129369 | 5/2003 |
| EP | 1600794 | 11/2005 |
| WO | WO 00/29874 | 5/2000 |
| WO | WO 00/54081 | 9/2000 |
| WO | WO 01/84204 | 11/2001 |
| WO | WO 03/071309 | 8/2003 |

* cited by examiner

*Primary Examiner* — Isam Alsomiri
*Assistant Examiner* — Daniel L Murphy
(74) *Attorney, Agent, or Firm* — King & Spalding L.L.P.

(57) ABSTRACT

The present invention relates to a seismic cable (3) comprising at least two sensor nodes (4), the cable being adapted to lie permanently on a seabed (5). By covering each sensor node (4) and a length of the cable (3) connecting the sensor nodes (4) with a flexible protective socket (7), there is obtained a leak-tight connection, whereby penetration of water and/or moisture into the components of the sensor node (4) is not permitted.

10 Claims, 2 Drawing Sheets

PROTECTIVE SOCKET FOR A SENSOR NODE

Figure 1:
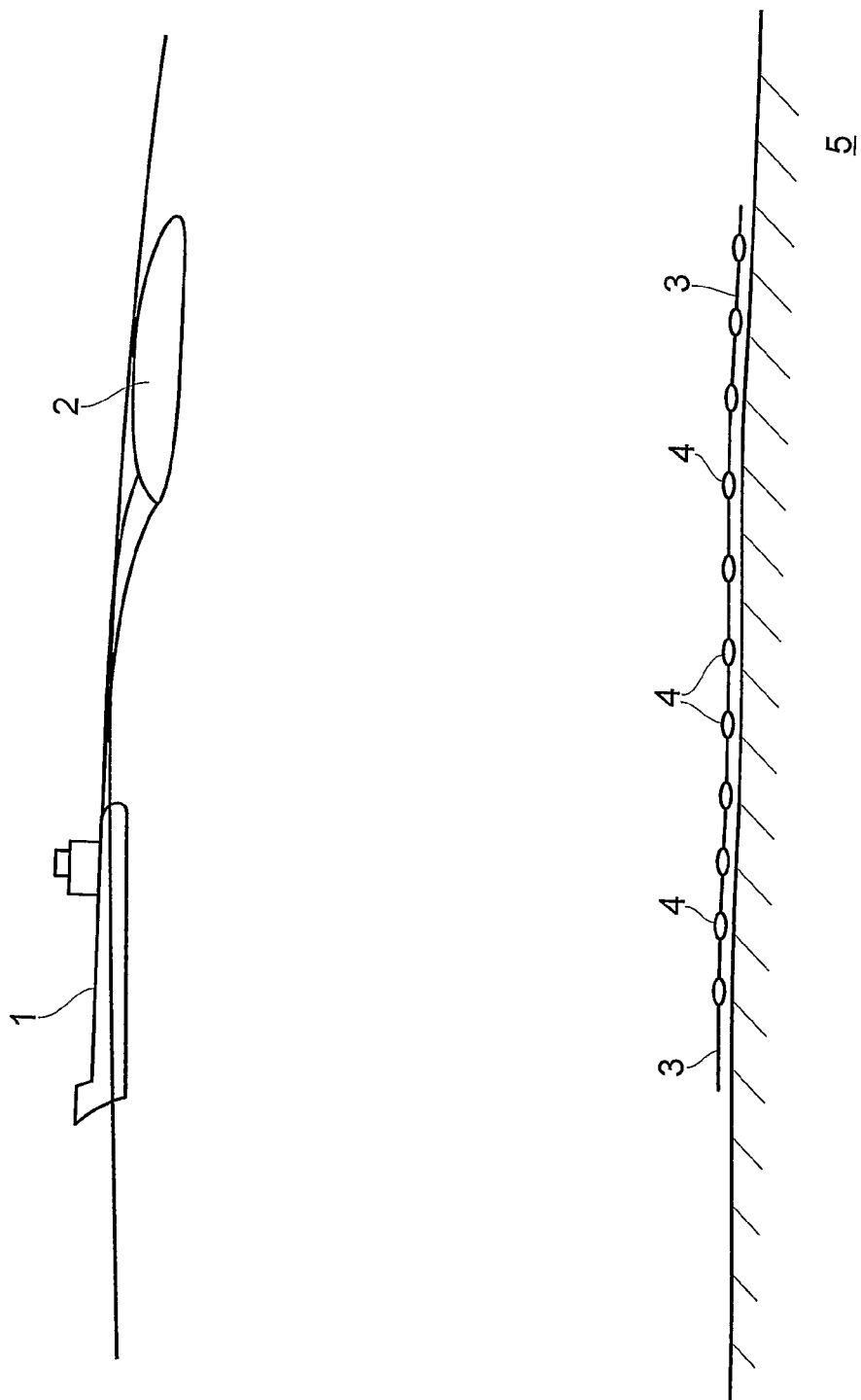

The present invention relates in general to a device for seismic cables which are used in connection with seismic and geophysical surveys, where the cables are adapted to be laid on a seabed, and more specifically the invention relates to double seal protection for a sensor node that is arranged on the seismic cable.

When searching for oil and gas, a great deal of work must be done to find out whether the conditions for the formation of oil and/or gas are present within an area. A part of this work includes so-called seismic surveys, which are to "draw" a picture of the underground. The principle on which a seismic survey is based is that a sound wave is transmitted from a signal source, the sound wave being directed downwards towards the seabed. The sound wave will thus penetrate far down into the seabed and be reflected back from all transitions or interfaces between the different geological layers in the underground. The reflected sound waves will be recorded by a receiving source, for example, a hydrophone or geophone, whereby the recorded data is then processed and managed in order to be put together to give a picture of the rock layers or strata (seismic sections) in the area. In this way it is possible to discover and map large structures such as upward bulges in the layers, faults and diapirs, and determine how thick the layers are or at what depth they are.

These surveys are carried out also when a field is in production, as it is desirable to chart how the field alters over time.

The most common method of carrying out the aforementioned seismic surveys offshore is to use a vessel that tows both a signal source and one or more seismic cables comprising a large number of hydrophones. Such cables, generally termed "streamers", are towed in an area just below the surface of the sea and they can be several kilometers long.

Because the above method employs cables that can be extremely long, it is not suitable for use in every instance. One such instance may, for example, be that in the area in which it is desired to perform a survey, there are many floating and/or fixed installations, which will prevent the cables from being towed in a straight line behind the vessel. In these instances, the seismic cables can be laid on the seabed in a desired position whilst the vessel, which now only tows the signal source, can easily be manoeuvred around the deployed floating structures. The reflected sound waves will then be picked up by the hydrophones lying on the seabed.

Another way of carrying out seismic surveys will be that separate, individual hydrophones or geophones are put out on the seabed using separate special tools, such as ROVs etc. When using such an approach, the hydrophones or geophones are most commonly driven some length down into the seabed.

From U.S. Pat. No. 6,483,776 B1 a seismic cable is known that is laid on the sea floor, the cable comprising sensor units adapted to detect vibrations in the sea floor. The sensor units are substantially heavier per unit of length than the cable arranged between them. The actual sensor unit comprises geophones, a hydrophone etc, which are arranged in a chamber or housing.

Another system that is used in seismic surveys of geological formations below the seabed is taught in NO 318 314. The system comprises a plurality of sensor nodes which are arranged for deployment on the seabed. Each sensor node comprises a generally cylindrical structure which is designed to penetrate down into the seabed. A controller is also connected to the sensor node, and they are lowered together to the seabed.

A common feature of known solutions will be that they are costly to produce and complex to install and/or use, and that they cannot remain long in the water before they must be taken up and serviced.

It will be disadvantageous to use the known systems and/or solutions when it is desired to carry out seismic surveys in all phases of petroleum operations, from before the opening of an area to a long way into production, with a view to following developments in the reservoir. With the known solutions, each time a survey is to be carried out, the sensors, which may be arranged on cables or provided as independent units, will have to be deployed/installed using special equipment, the actual survey is then carried out, after which, upon completion of the survey, the deployed sensors and equipment will have to be removed again.

In view of the above, it will therefore be one of the objects of the present invention to provide a seismic cable which can be placed on the seabed, the cable being adapted to lie as a "permanent" system on the seabed.

In view of the above, it will therefore be one of the objects of the present invention to provide a seismic cable which can be placed on the seabed as a system that is adapted Another object of the present invention is to provide a seismic cable by means of a simple and inexpensive manufacturing process.

Yet another object of the present invention is to provide a seismic cable that is easy to lay on the seabed.

A further object of the present invention is to provide a seismic cable that is simple in structure and does not require frequent inspection and maintenance.

Still another object of the present invention is to provide a seismic cable on which external environmental factors have very little effect.

Yet another object of the present invention is to provide a seismic cable which can be used in seismic surveys on existing oil/gas fields, during large parts of the field's lifetime.

In a first aspect of the invention, there is provided a seismic cable that is adapted to be placed as a "permanent" cable on the seabed on or in the region of an existing oil/gas field. By "permanent" here is meant a cable or cable system that is suitable for long-term use on the seabed, typically as long as about 25 years, where during this time period a minimum of maintenance work must be done on the cable. The seismic cable comprises at least two sensor nodes which are spaced apart and which are connected by a cable. Several such cable lengths can be laid in a pattern, for example, parallel to one another on the seabed. Bottom conditions (currents, firm/soft bottom etc.) in the area in which the seismic cables are to be placed will determine whether the cable network formed is to be buried in the seabed, is to lie loose on the seabed or is to be fastened to the seabed by means of auxiliary cables or the like.

The actual cable that is laid out on the seabed is, because of its outer sheath, relatively well protected against water penetration and corrosion, but the sensor unit is more vulnerable to the effect of the surrounding water and must therefore be protected effectively. This involves the sensor unit being protected by an outer housing or cover, where said housing is made of a material that withstands contact with water. However, the housing will not protect the sensor unit against water penetration and therefore it is important to protect the junction between the seismic cable and the sensor unit, as well as the sensor unit itself. This must be done on both sides of the sensor housing. Therefore, within the outer housing or cover around the sensor unit and its components there is provided a flexible protective socket. The protective socket comprises two end parts, which end parts are intended to be pulled over a length of the cable connecting the sensor units to each other.

The end parts have an internal surface which is adapted to seal around a cable, so that water and/or moisture does not pass into the sensor unit from the cable side. Each of the end parts is further connected to a respective conical intermediate piece, the end parts and the conical intermediate pieces being connected to each other by a central body.

Together, the end parts, the conical intermediate pieces and the central body form a whole protective socket, which seals from cable outer sheath to cable outer sheath. This sealing is obtained in that the protective socket lies pretensioned over the sensor unit and parts of the cable. The protective socket may be made as a whole unit, or it may comprise several parts which cooperate to form a whole protective socket, and how this is done will be understood by those of skill in the art.

In addition, sub-cables connected to the sensor node's sensor and hydrophone will also be surrounded by protective sleeves, which have the same properties as the protective socket, the sensor node thus being protected by means of a "double barrier".

The protective socket and sleeve are made of a material that is flexible and which thus exerts a pressure against the elements it/they cover, i.e., the seismic cable and the sensor node. The material may, for example, be a rubber or composite blend.

The sensor node itself comprises a sensor housing, in which housing the sensor is arranged. The housing is formed of a material (metal) which is pressure-resistant because of the substantial pressure loads it may be subjected to, but is otherwise made of fairly inexpensive materials, for example, rust-proof metals, such as cast iron etc.

At each end of the sensor housing there is further arranged a conical ring element, which ring element serves several purposes. The ring element abuts against a flange that extends outwards from the end sides of the sensor housing and extends around the periphery of the sensor housing, thereby forming a leak-tight connection between the sensor housing and the ring element. A sealing layer may also be placed between the outside of the flange and the inside of the ring element as further protection against leakage. At its opposite end, i.e., opposite the end that rests against the sensor housing flange, the ring element is passed along the cable that connects the sensor nodes together. Here, a virtually sealed connection will thus be formed between the cable and the ring element. Different equipment, for example, a hydrophone, may be arranged in the internal space formed by the ring element. To prevent the hydrophone from lying loose in this space, the ring element is filled internally with a material that can absorb any shocks and/or impacts to which the sensor node may be subjected, thereby preventing the hydrophone from being damaged. This material may, for example, be a gel, but other materials with similar properties may also be used.

At each of the end sides of the sensor housing, i.e., in the sides of which the flange is a part, there is provided a lead-in and/or connecting device. The device is used to connect sub-cables in the seismic cable together to the sensor or sensors that are located in the sensor housing and the hydrophone that is arranged in the ring element. Each of the sub-cables, which are passed in or out of the sensor housing through the lead-in and/or connecting device, is as previously described covered with a protective sleeve.

As a fixed connection is formed between the ring element and the seismic cable, the end piece of the cable extending a length into the ring element, the ring element will take up any tension, pressure or bending to which the seismic cable is subjected, so that the sub-cables are not subjected to these loads with a danger of being worn off.

The sensor unit (sensor housing) and the ring elements on each side of the sensor unit thus together form the sensor node.

With the seismic cable according to the invention an attempt is made to eliminate or at least reduce the disadvantages associated with existing solutions.

Other advantages and special features of the present invention will be clearly apparent from the following detailed description, the attached drawing and the following claims.

Figure 2:
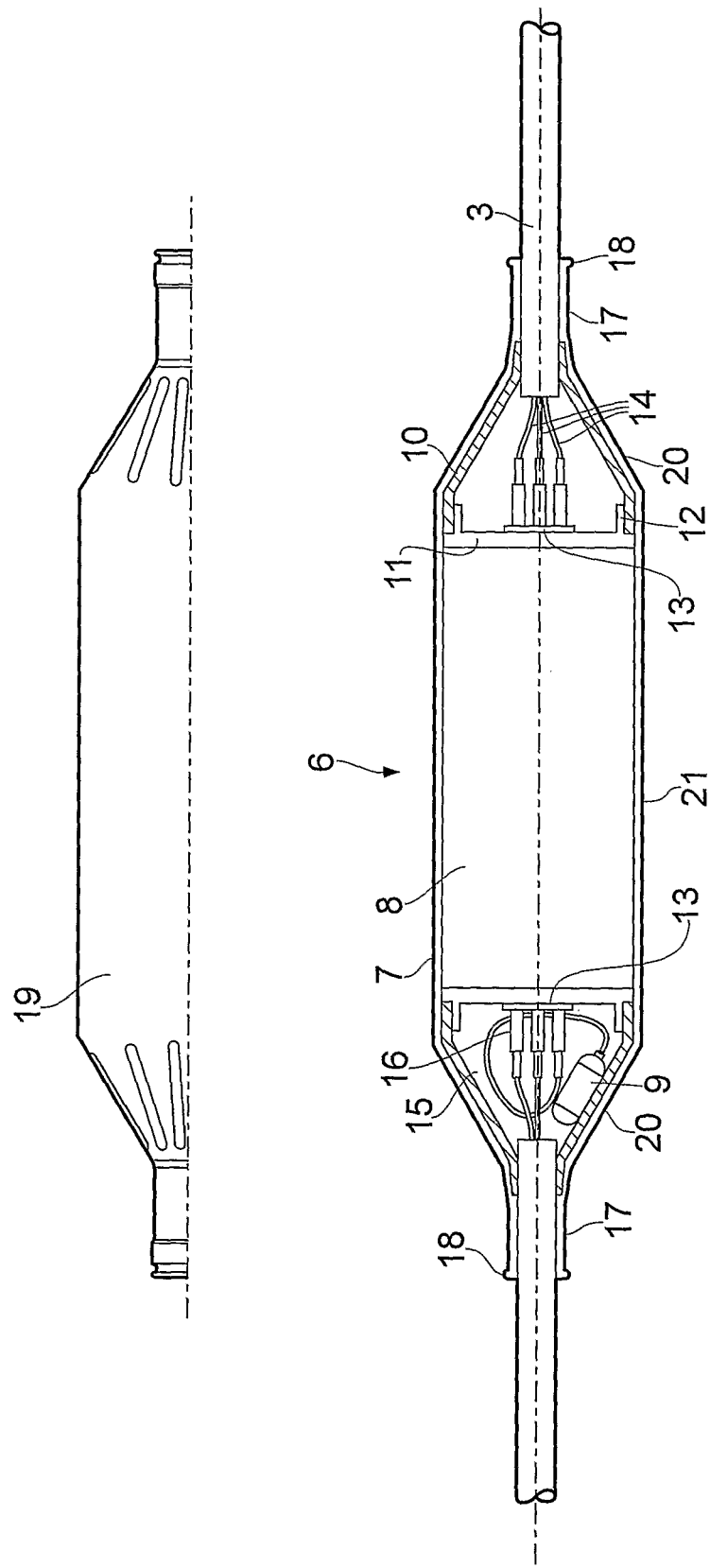

FIG. 1 shows a seismic cable with protected sensor nodes according to the present invention that has been laid on the seabed; and FIG. 2 shows a (partial) cross-section of the sensor unit.

FIG. 1 shows a surface vessel 1 towing a signal source 2. From this source 2 a signal is sent which penetrates far down into a seabed 5. The signal will be reflected back from all transitions between the different geological layers in the underground. The many reflected signals are recorded by sensor nodes 4 which are arranged in a seismic cable 3. Although the cable 3 in the figure is shown resting on the seabed it should also be understood that the cable 3 can be buried in the seabed, covered, etc, to prevent it from being damaged by trawls, nets, ocean currents etc.

FIG. 2 shows how a sensor unit 6 is made. The sensor unit 6, which also can be seen to be a housing, holds at least one sensor (not shown). On each side of the actual sensor unit 6 there is arranged a conical ring element 10, in which ring element 10 a hydrophone 9 is disposed. The ring element 10 is so arranged that its open edge abuts against a flange 12 on an end side 11 of the sensor unit 6, whilst the other open end of the ring element 10 is arranged along a length of the cable 3. The flange 12 projects from the end side 11 and extends around the whole periphery of the sensor unit 6.

At each end side 11 of the sensor unit 6 there are provided lead-in and/or connecting devices 13 for at least one sub-cable 14, and this design thus permits a connection to be formed between the cable 3, the sub-cables 14 and the sensor (not shown) and the hydrophone 9, thereby enabling electrical and/or other signals to be transmitted along the entire length of the seismic cable 3.

It is however important that the sub-cables 14 that are connected to the sensor (not shown) through the lead-in and/or connecting device 13 are not subjected to a tensile force as this may result in the connection being broken. Therefore, the conical ring element 10 must be configured in such manner that a tensile force in the sub-cables 14 is not permitted. In addition, a space that is defined by the end side 11, the conical ring element 10 and the cable 3 will be filled with a material, for example, a gel 15, which is intended to protect a hydrophone 9 located in this space from any impacts and/or shocks to which the seismic cable 3 may be subjected.

It can also be seen from the figure that the sub-cables 14 that are passed through the lead-in and/or connecting device 13, in order to be connected to the sensor (not shown) and the hydrophone 9, are protected by a protective sleeve 16. The protective sleeve 16 can extend a distance into the sensor unit 6 in that it is passed together with the sub-cables 14 through the lead-in and/or connecting device 13, and is such that it will form a sealing gasket between the sub-cables 14 and the sensor housing 6. Water is thus prevented from flowing into the sensor housing 6.

Over the actual sensor node 4, which comprises the sensor unit 6 and the two ring elements 10, there is provided a flexible protective socket 7, said protective socket 7 comprising two end parts 17 that extend a length along the outer sheath of the cable 3. Since the protective socket 7 is made of a flexible material, the end parts 17 of the protective socket 7, by means of their inner surface, will be capable of forming a sealing connection with the cable 3. The end parts 17 are terminated by an outwardly projecting flange 18, said flange 18 being formed complementarily to a recess in an outer cover 19.

Each of the end parts 17 is further connected to a conical intermediate piece 20, which intermediate piece 20 has a shape corresponding to that of the conical ring element 10.

The conical intermediate pieces 20 are further connected to a central body 21, said central body being adapted to the shape of the sensor unit 6.

The end parts 17, the conical intermediate pieces 20 and the enlarged central body 21 thus form a whole protective socket 7, which extends from a length along a cable outer sheath, via the first conical ring element 10, over the sensor unit 6 and then via the second conical ring element 10, to be terminated a length along a cable outer sheath on the opposite side.

This embodiment will give a protective socket 7 which, because of its flexibility, will lie pretensioned not only against the sensor node 4, but also against a part of the cable 3, thereby forming a completely leak-tight connection with the surrounding environment.

The material of which both the protective socket 7 and the protective sleeves 16 are made may be of a rubber quality or of a composite blend. The point is to use a material that is flexible, where the flexibility of the material results in the protective socket 7 and protective sleeves 16 contracting around the sensor housing and the sub-cables 14. This thus provides a double barrier, where the protective socket 7 will function as an outer barrier, whilst the protective sleeves 16 will constitute an inner barrier.

As additional protection of the sensor node 4 there may be provided an outer cover 19 over the sensor node 4 and the surrounding protective socket 7, which cover 19 can be fastened in a known way to the cable. The cover 19 may be made of any suitable material, for example, metal, plastic, composite etc.

The invention has now been explained with reference to several non-limiting embodiments. Those of skill in the art will understand that it will be possible to make a number of variations and modifications of the seismic cable as described within the scope of the invention as defined in the appended claims.

The invention claimed is:

1. A seismic cable for use on or close to a seabed comprising:
   a cable, and
   at least one sensor node connected to the cable and comprising:
   a cylindrical sensor unit including a sensor,
   at least one hydrophone,
   a pair of end sides, each including a flange,
   a pair of conical ring elements at opposite ends of the cylindrical sensor unit, each conical ring element having a first end abutting the flange of a respective end side and a second end arranged along a length of the cable, and
   a flexible protective socket arranged around the cylindrical sensor unit, the conical ring elements, and parts of the cable, the flexible protective socket comprising:
   a cylindrical central body connected at each end to a conical intermediate piece having a shape corresponding to a respective conical ring element,
   wherein each conical intermediate pieces is terminated in a flexible end part,
   wherein an inner surface of each end part forms a leak-tight connection around and along a length of an outer surface of the cable due to the flexibility of the end part.

2. A seismic cable according to claim 1, wherein the sensor unit is made of a pressure-resistant material.

3. A seismic cable according to claim 1, wherein the at least one hydrophone is housed in at least one of the conical ring elements.

4. A seismic cable according to claim 1, wherein each conical ring element is filled with a material that is suitable for damping impacts or shocks.

5. A seismic cable according to claim 1 wherein each end side includes at least one of a lead-in and a connecting devices for at least one sub-cable.

6. A seismic cable according to claim 1, wherein:
   each end side includes at least one of a lead-in and a connecting device for at least one sub-cable, and
   the sub-cables, in transitional areas between the sensor unit and each of the conical ring elements, are protected by a protective sleeve.

7. A seismic cable according to claim 1, wherein the cable extends a length within each of the conical ring elements.

8. A seismic cable according to claim 1, wherein the protective socket is configured in several pieces, the pieces being arranged so as to obtain leak-tight protection around the cable and conical ring elements.

9. A seismic cable according to claim 1, wherein a cover is arranged over the protective socket.

10. A sensor system for use on or near a seabed, comprising:
    at least one sensor node connected to a cable and comprising:
    a cylindrical sensor unit including a sensor,
    at least one hydrophone,
    a pair of end sides, each including a flange,
    a pair of conical ring elements at opposite ends of the cylindrical sensor unit, each conical ring element having a first end abutting the flange of a respective end side and a second end arranged along a length of a cable, and
    a flexible protective socket arranged around the cylindrical sensor unit, the conical ring elements, and parts of the cable, the flexible protective socket comprising:
    a cylindrical central body connected at each end to a conical intermediate piece having a shape corresponding to a respective conical ring element,
    wherein each conical intermediate pieces is terminated in a flexible end part,
    wherein an inner surface of each end part forms a leak-tight connection around and along a length of an outer surface of the cable due to the flexibility of the end part.

* * * * *